United States Patent [19]

D'Alterio

[11] Patent Number: 4,941,402
[45] Date of Patent: Jul. 17, 1990

[54] APPARATUS FOR ENCAPSULATING FILLER WITH DOUGH

[76] Inventor: Joseph C. D'Alterio, 64 Sugar Maple La., Glen Cove, N.Y. 11542

[21] Appl. No.: 356,221

[22] Filed: May 24, 1989

[51] Int. Cl.$^5$ .......................... A21C 9/00; A21C 9/06
[52] U.S. Cl. .................................. 99/450.6; 99/450.7; 425/112; 425/131.1
[58] Field of Search .................. 99/450.1, 450.2, 450.6, 99/450.7, 450.8, 494, 353; 426/282, 283, 503; 425/130, 131.1, 112

[56] References Cited

U.S. PATENT DOCUMENTS

| | | | |
|---|---|---|---|
| 1,108,461 | 8/1914 | Michitsch | 99/450.2 |
| 1,844,142 | 2/1932 | Barili | 99/450.7 |
| 2,837,042 | 6/1958 | Laval, Jr. | 99/450.1 |
| 2,905,105 | 9/1959 | Lombi | 99/450.6 |
| 3,605,641 | 9/1971 | Shuster | 99/450.7 |
| 3,689,280 | 9/1972 | Werner | 99/450.1 |
| 4,160,634 | 7/1979 | Huang | 425/112 |
| 4,671,759 | 6/1987 | Hayashi et al. | 425/294 |
| 4,789,319 | 12/1988 | Garcia | 425/131.1 |
| 4,848,218 | 7/1989 | Battaglia | 99/450.7 |

FOREIGN PATENT DOCUMENTS 1409187  7/1988  U.S.S.R. ............................. 99/450.6

*Primary Examiner*—Timothy F. Simone
*Attorney, Agent, or Firm*—Paul W. Garbo

[57] ABSTRACT

An apparatus for producing dough capsules containing a filler comprises a feed roller, a pocket-forming roller with axially and circumferentially equispaced cavities in its cylindrical surface and with a circumferential thin ridge thereon between each pair of axially spaced cavities, a cutting roller with circumferentially equispaced flutes extending lengthwise thereof and with a lengthwise thin ridge between each pair of flutes. The pocket-forming roller is parallel to, and in contact with, an upper quadrant of the feed roller, while the cutting roller is parallel to, and in contact with, the adjacent lower quadrant of the feed roller. Synchronous drive means rotates the feed roller in one direction and the other two rollers in the opposite direction. A dough sheet with longitudinal beads of filler aligned with the axially spaced cavities of the pocket-forming roller and a cover dough sheet enter the bite between the feed and pocket-forming rollers. There the dough capsules containing filler are formed as linked capsule strips which are cut into individual capsules on passing through the bite of the feed and cutting rollers.

9 Claims, 3 Drawing Sheets

APPARATUS FOR ENCAPSULATING FILLER WITH DOUGH

BACKGROUND OF THE INVENTION

This invention relates to means for encapsulating a filler with dough. Various products in the form of dough envelopes containing a filler are an important segment of the processed food industry. Ravioli, won ton, pierogies and kreplach are popular examples of pasta-type products while apple dumplings are illustrative of baked products.

Many of these products are made by hand or with devices that require stepwise operation. Ravioli have perhaps received the greatest attention and efforts to develop machinery for their rapid production. Currently, a sheet of fresh pasta receives spaced gobs of filler such as ricotta or ground meat and another sheet of fresh pasta is laid thereover. The two pasta sheets are pressed together around each gob of filler so that each filler gob is sealed between the pasta sheets. Then a cutter is used to cut around each dough-encapsulated filler gob to yield individual ravioli. In short, the food industry is still seeking simple apparatus for the rapid manufacture of filled dough products.

It is therefore a principal object of this invention to provide a simple apparatus for the rapid production of dough capsules containing a filler.

Another important object is to provide such an apparatus in a compact arrangement of three rollers.

Other features and advantages of the invention will be apparent from the description which follows.

SUMMARY OF THE INVENTION

In accordance with this invention, an apparatus for forming envelopes or capsules of dough containing a filler comprises three parallel rollers: a cylinderical feed roller, a pocket-forming roller and a cutting roller. The three rollers are synchronously driven by a gear train or by sprocket gears and linking chain. An electric motor used to drive the three rollers may be connected to an end of any of the rollers but desirably is connected to the feed roller.

The feed roller is a plain cylinder. The pocket-forming roller is a cylinder with axially and circumferentially equispaced cavities or pockets. A circumferential thin ridge projects outwardly from the surface of the pocket-forming roller between each pair of axially spaced pockets. The cutting roller has radially equispaced flutes extending over the length of the roller. The surface of the cutting roller between each pair of radially spaced flutes has a thin ridge projecting outwardly therefrom.

The pocket-forming roller is positioned parallel to, and in contact with, the upper portion of the feed roller, while the cutting roller is positioned parallel to, and in contact with, the lower portion of the feed roller. The pocket-forming roller and the cutting roller contact the same side of the feed roller relative a vertical plane through the axis of the feed roller. Preferably, the points of contact of the pocket-forming roller and the cutting roller with the feed roller are separated by an arc not greater than about 90°.

The circumferential ridges on the pocket-forming roller contact the feed roller and thus cut the dough passing between the feed roller and the pocket-forming roller into longitudinal strips and as these strips pass between the feed roller and the cutting roller they are cut transversely by the contact of the lengthwise ridges of the cutting roller with the feed roller.

The ridges on the pocket-forming roller and on the cutting roller act as knife blades that cut through the fresh dough. These cutting blades or ridges may be rectilinear or corrugated lengthwise. The corrugations may be undulations or pleats.

It is well to note that the pockets or cavities of the pocket-forming roller should have a length in the circumferential direction which is slightly less than the width of the open end of the flutes of the cutting roller. This slight dimensional difference ensures that the dough capsules or envelopes containing a filler which are formed as continuous strips by the pocket-forming roller will not stick in the flutes of the cutting roller but will drop freely as loose, individual capsules.

All three rollers are usually made of stainless steel. To ensure against any sticking of fresh dough, the pocket-forming roller and the cutting roller preferably have a thin coating of a plastic such as Teflon TM, polytetrafluoroethylene.

The number of cavities in the pocket-forming roller will depend upon the desired production rate of filled dough capsules. The number of cavities in each circumferential alignment, a matter of design, depends on the desired size of the cavities and the diameter of the roller. The number of cavities in each axial alignment depends on the desired size of the cavities and the length of the roller. The number of flutes in the cutting roller is correlated to the number of circumferential cavities in the pocket-forming roller. As previously mentioned, the width of the open end of the flutes is made slightly greater than the circumferential length of a cavity to ensure that the cut dough capsules will not stick in the flutes but will freely drop out.

BRIEF DESCRIPTION OF THE DRAWINGS

For a better understanding of the invention, the further description thereof will refer to the accompanying drawings of which.

DESCRIPTION OF PREFERRED EMBODIMENTS

Figure 1:
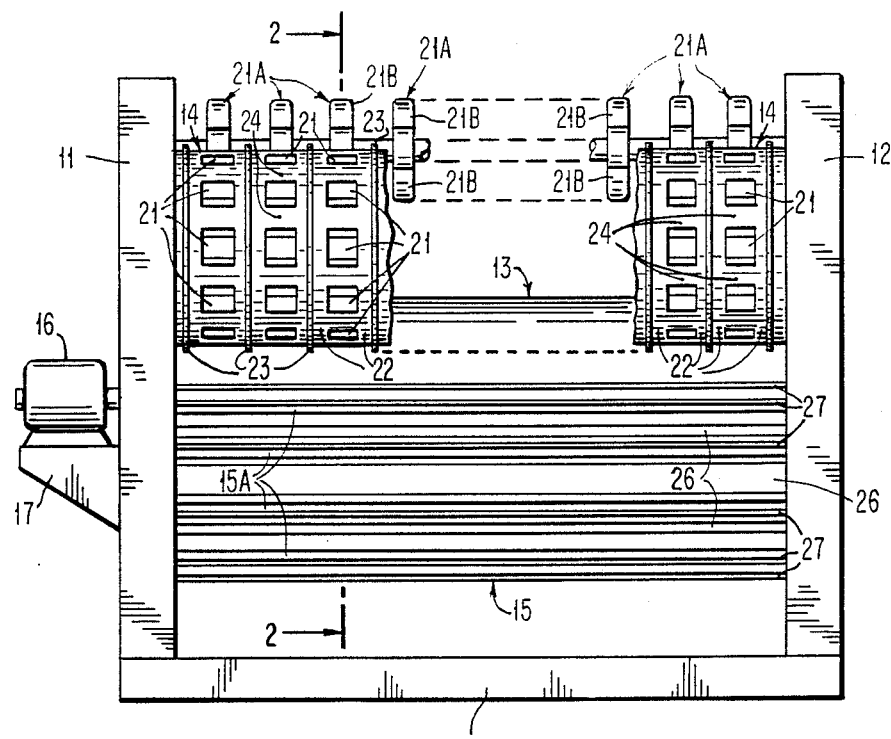
FIG. 1 is an elevation of the apparatus of the invention showing the side with the pocket-forming roller and the cutting roller.
Figure 2:
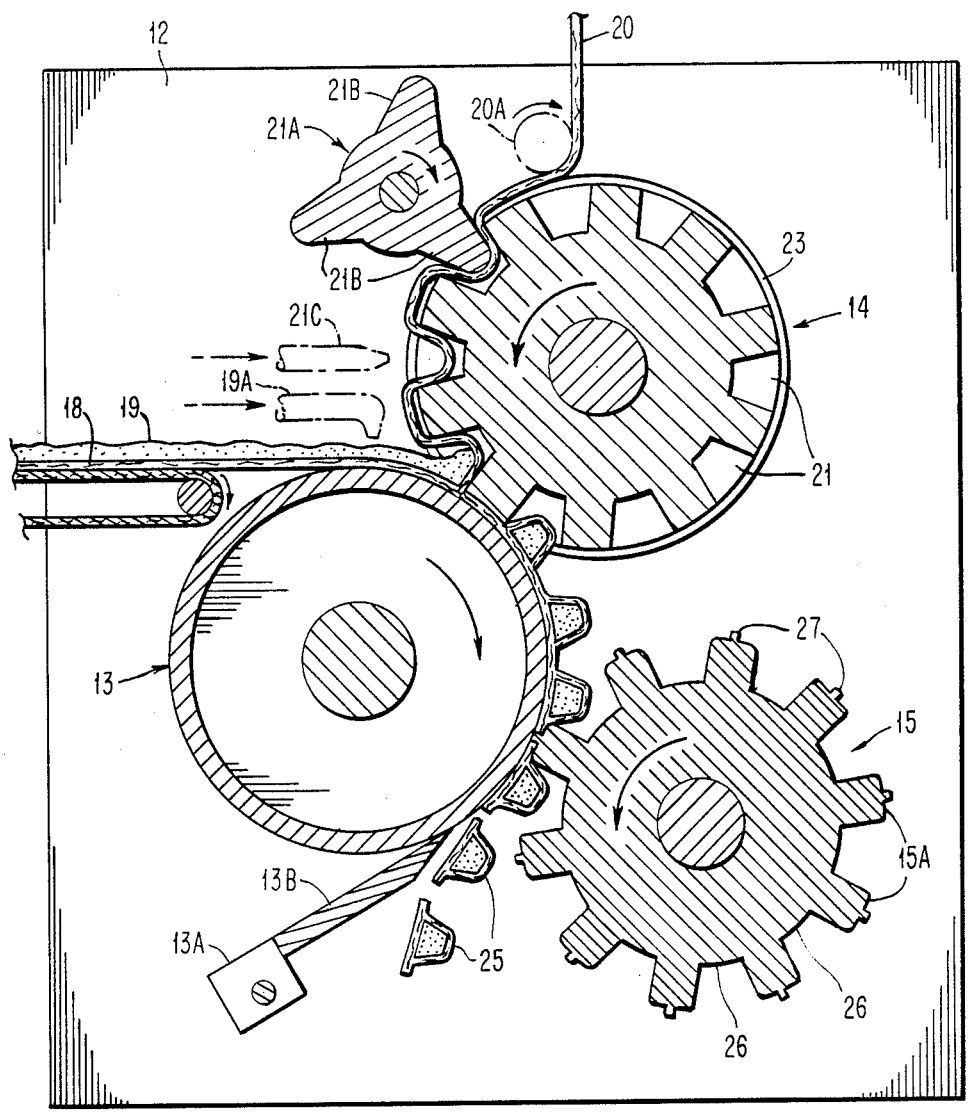
FIG. 2 is an enlarged sectional view of the three rollers of the apparatus of FIG. 1, taken along line 2—2.

FIG. 1 shows the three rollers of the invention mounted in a frame comprising base plate 10 and upright cases 11,12 which hold the bearings and synchronous drive means for the three rollers. Feed roller 13 is partially visible between higher pocket-forming roller 14 and lower cutting roller 15. Electric motor 16 which is coupled to the axle of feed roller 13 is supported by bracket 17 attached to upright case 11. Roller 14 has any desired number of pockets or cavities 21 which are uniformly spaced from one another both axially and circumferentially. Cutting roller 15 has the same number of longitudinal flutes 26 as the number of cavities 21 in a single circumferential alignment or series of roller 14. FIG. 2 shows in cross-section that roller 14 has ten cavities 21 and roller 15 has ten flutes 26.

Figure 1B:
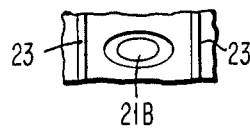
FIGS. 1A and 1B illustrate shape variations of the square pockets shown in the pocket-forming roller of FIG. 1.
Figure 1A:
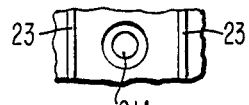

While square cavities 21 are shown in FIG. 1, other cavity shapes may be used. FIG. 1A is a fragmentary view of the pocket-forming roller of FIG. 1 illustrating a circular cavity 21A. Similarly, FIG. 1B illustrates an oval cavity 21B.

FIG. 2 shows the spatial arrangement of rollers 13,14, 15, and their rotational directions. A sheet of fresh dough or pasta 18 with parallel linear deposits or beads of filler 19 thereon is drawn by feed roller 13 rotating clockwise while a second sheet of pasta 20 is fed downwardly, preferably guided by idler roll 20A, on pocket-forming roller 14 which rotates counterclockwise and thus conveys pasta sheet 20 into the bite between roller 14 and feed roller 13. With large cavities 21, it is advisable to provide dimpling means, i.e., means to cause pasta sheet 20 to stretch inwardly in cavities 21. The dimpling means may be rotary dimpler 21A shown with three fingers 21B or nozzle 21C from which a spurt of compressed air will depress pasta sheet 20 in cavities 21. Of course, a rotary dimpler 21A or a nozzle 21C is aligned with each circumferential series of cavities 21 of roller 14. The rotation of dimpler 21A or the spurting of compressed air is timed relative to the rotation of roller 14 to achieve the desired dimpling of pasta sheet 20.

Each parallel filler bead 19 on pasta sheet 18 is aligned with a circumferential series of pockets 21 in roller 14. As rollers 13,14 rotate in opposite directions, pasta sheets 18, 20 move into the bite of rollers 13,14 and are there compressed and fused into a single sheet in the area where roller 14 has cylindrical surface bands 22 between axially spaced pockets 21. Each surface band 22 has a thin ridge 23 projecting therefrom which acts as a knife blade that simultaneously cuts the compressed pasta sheets 18,20 into longitudinal strips. Similarly, when a lengthwise surface band 24 between circumferentially spaced pockets 21 passes through the bite of rollers 13,14 pasta sheets 18,20 in that area are compressed and fused together with the result that the continuous filler bead 19 is simultaneously interrupted, being squeezed partially forward and partially backward. Pasta sheet 20 which covers filler 19 on pasta sheet 18 stretches around filler 19 and the resulting envelope or capsule 25 containing filler 19 fits in, and is shaped by, cavity 21 of roller 14.

Pasta sheets 18,20 which were originally wide enough to cover the axial length of rollers 13,14 leave the bite thereof as a multiplicity of strips, each slightly wider than the width of pockets 21 measured along the length of roller 14. Each strip is a linked series of filled pasta capsules 25. As the strips are carried around by rotating feed roller 13, they enter the bite between roller 13 and counter-rotating cutting roller 15. Ridges 27 project outwardly from the cylindrical surface bands 15A of roller 15 between flutes 26 and extend over the length of roller 15. Each time a surface band 15A with its ridge 27 passes through the bite of rollers 13,15 the strips of linked pasta envelopes 25 are again compressed and simultaneously cut between envelopes to yield individual, separate envelopes 25 as the final product. Of course, the rotation of rollers 14,15 is synchronized so that each axial alignment of filled pasta envelopes 25 formed by pocket-forming roller 14 fits in a flute 26 of cutting roller 15. With such synchronization, ridge 27 cuts across the strips of linked pasta envelopes 25 between envelopes 25 and not through them.

Figure 3:
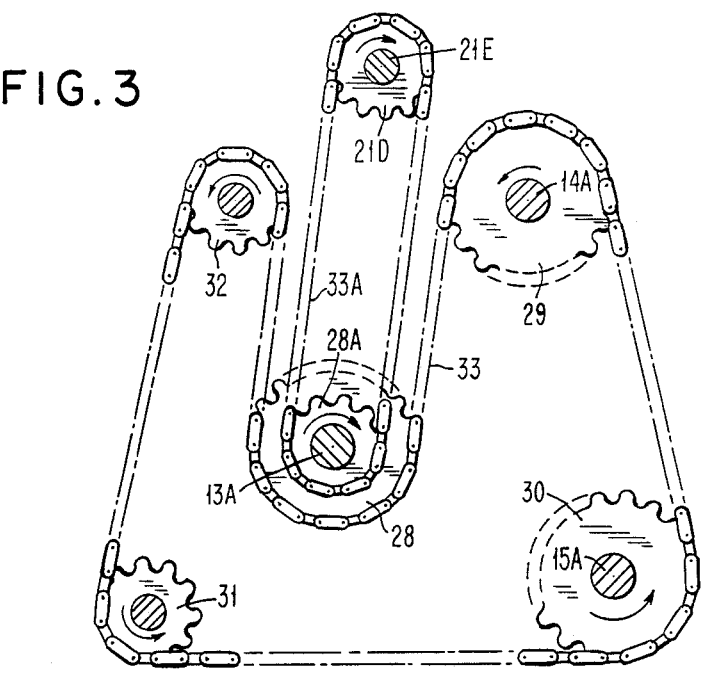
FIG. 3 is a diagrammatic representation of sprocket gears and a linking chain for synchronously driving the three rollers of the invention.

FIG. 3 shows schematically one method of synchronizing the rotation of rollers 13,14,15. FIG. 3 is for a mechanical drive installed in upright case 11. Axle 13A of feed roller 13 has sprocket gear 28 mounted thereon. Axle 14A of pocket-forming roller 14 is equipped with sprocket gear 29 and axle 15A of cutting roller 15 has sprocket gear 30. Sprocket gears 31,32 are mounted in case 11 as idlers. Link chain 33 passes partially around each of sprockets 28,29,30,31,32. With electric motor 16 coupled to axle 13A of feed roller 13 to drive it clockwise as viewed in FIG. 3, link chain 33 will drive rollers 14,15 as well as idlers 31,32 counterclockwise. When dimpling of pasta sheet 20 is desired and a mechanical device such as rotary dimpler 21A is used, the rotation of dimpler 21A is also synchronized with the rotation of pocket-forming roller 14. This is simply accomplished by having another sprocket gear 28A mounted on axle 13A and sprocket gear 21D on axle 21E of dimpler 21A with second link chain 33A passing around sprockets 21D,28A.

Figure 4:
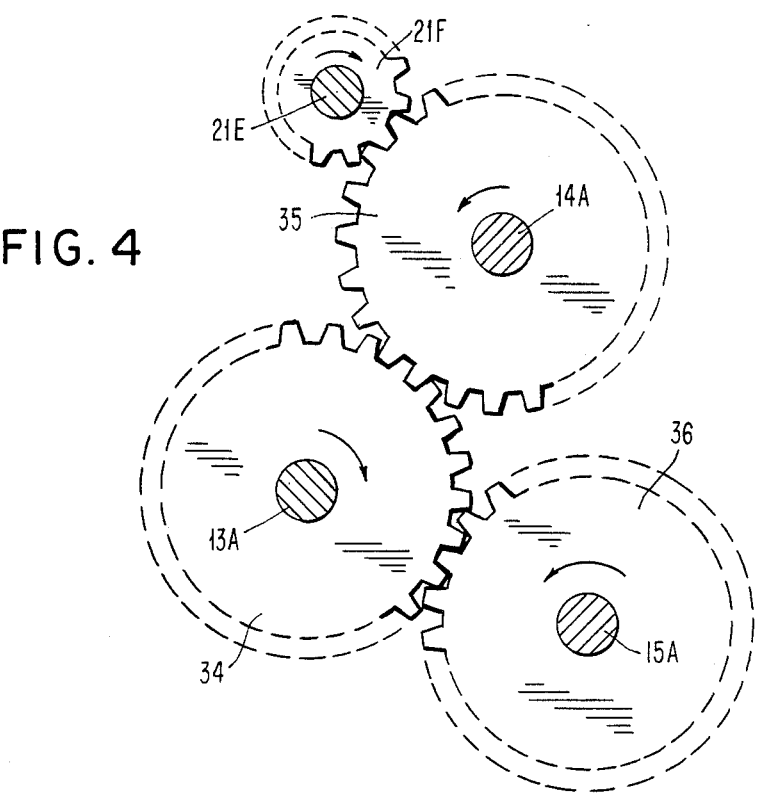
FIG. 4 is a diagrammatic representation of a gear train used as alternative means for synchronously driving the three rollers of the invention.

FIG. 4 shows schematically another method of synchronizing the rotation of rollers 13,14,15. FIG. 4 shows a gear train that would be installed in upright case 11. Axle 13A of feed roller 13 has gear 34 mounted thereon. Gear 35 on axle 14A of pocket-forming roller 14 meshes with gear 34. Axle 15A of cutting roller 15 has gear 36 which meshes with gear 34. As in FIG. 3, if motor 17 is coupled to axle 13A to rotate it clockwise, the clockwise rotation of gear 34 will cause counterclockwise rotation of gears 35,36 and associated rollers 14,15, respectively. If dimpler 21A is used, gear 21F mounted on axle 21E and meshing with gear 35 will rotate dimpler 21A clockwise which is the desired direction.

Figure 5:
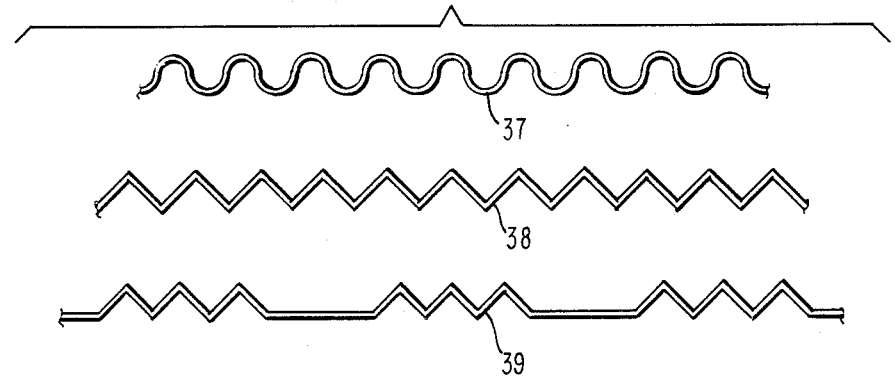
FIG. 5 is a view of different cutting ridges on the pocket-forming roller and the cutting roller of the invention.

FIG. 5 is a view of the cutting edge of three variations of ridges 23,27 which are shown as rectilinear blades in FIG. 1 and FIG. 2. Corrugated ridge 37 has smooth undulations while corrugated ridge 38 has a pleated or serrated shape. Corrugated ridge 39 has a combination of serrated and straight portions. Any of corrugated ridges 37,38,39 can be substituted for rectilinear ridges 23 on pocket-forming roller 14 and/or for the rectilinear ridges 27 on cutting roller 15. In short, the shape of the cutting edge of ridges 23,27 can be varied as illustrated by ridges 37,38,39 of FIG. 5 to produce filled dough envelopes or capsules with diverse decorative edges.

In a specific example of the invention, the three rollers have a diameter of 3.25 inches. Ridges 23 on pocket-forming roller 14 add 0.12 inch to the effective diameter of roller 14. Similarly, ridges 27 on cutting roller 15 increase its diameter by 0.12 inch. Ten cavities 21 are uniformly spaced from one another around roller 14 and ten flutes 26 are uniformly spaced from one another around roller 15. Cavities 21 have a square open end measuring 0.5 inch on each side. Roller 14 has ten cavities 21 in axial alignment and separated by 0.5 inch from one another. Hence, they are one hundred cavities 21 in roller 14. Circumferential ridges 23 are in the centers of the 0.5 inch spacings between cavities 21. At each end of roller 14 there is also a ridge 23 positioned 0.25 inch away from cavities 21 at that end. The depth of cavities 21 is 0.43 inch. The open end of each flute 26 in roller 15 is 0.62 inch wide and the depth of flutes 26 is 0.38 inch. Rollers 14,15 have a surface coating of Teflon ™.

In the operation of the apparatus just described, pasta sheets 18,20 are each 0.04 inch thick but are compressed and fused together to a thickness of 0.06 inch in passing through the bite of rollers 13,14. Each of the ten continuous beads of filler 19, e.g., ricotta, deposited in parallel on pasta sheet 18 before it enters the bite of rollers 13,14, is aligned with one of the ten circumferential series of cavities 21 in roller 14. The beads of ricotta are extruded from nozzles having an orifice diameter of 0.25 inch. With each rotation of rollers 13,14,15 one hundred ravioli are formed and drop from cutting roller 15 into a container or preferably onto a conveyor belt for delivery to a packaging or cooking station. At a normal operating rate of 10 to 50 revolutions per minute, it is evident that the small rollers 13,14,15 of the example of the invention produce a large number of ravioli. Thus, at 30 revolutions per minute, the hourly production is 180,000 ravioli.

Variations and modifications of the invention will be apparent to those skilled in the art. For instance, in FIG. 2 pasta sheet 18 is shown as being fed with a continuous bead of filler 19 laid thereon in alignment for each circumferential series of cavities 21 in roller 14 but the continuous filler bead 19 can be interrupted into a series of filler gobs. For example, nozzle 19A can be used to deposit dabs or gobs of filler in timed relation to the travel of pasta sheet 18 so that each filler gob will be carried by sheet 18 into a cavity 21 of roller 14. Such interrupted deposits of filler are preferred when the capsules have a relatively large volume of filler while continuous deposits of filler are favored for the production of capsules having a small content of filler. To ensure that no pasta capsule 25 remains stuck on the surface of roller 13, a bar 13A parallel to roller 13 may be provided with a flexible scraper blade 13B contacting roller 13 over its entire length below the bite of rollers 13,15. The diameter and/or length of the three rollers can be varied to alter the number of cavities 21 in pocket-forming roller 14 and achieve any desired production rate for dough capsules 25. Also, the dimensions of cavities 21 in roller 14 as well as their shape (e.g., oblong, circular, oval) can be varied to produce dough capsules or different sizes with the encapsulated filler forming bulges of different shapes (e.g., oblong, circular, oval). Electric motor 16 can be connected to the axle of roller 14 or roller 15 instead of roller 13 and still synchronously drive all three rollers by mechanical means similar to those illustrated in FIGS. 3 and 4. Accordingly, only such limitations should be imposed on the scope of the invention as are set forth in the appended claims.

What is claimed is:

1. An apparatus for continuously encapsulating a filler with fresh dough in the form of a multiplicity of dough capsules containing said filler, which comprises;

a cylindrical feed roller, a pocket-forming roller with axially and circumferentially equispaced cavities in its cylindrical surface and with a circumferential thin ridge projecting from said surface between each pair of said axially spaced cavities, said pocket-forming roller being positioned parallel to, and in contact with, an upper quadrant of said feed roller, a cutting roller with circumferentially equispaced flutes extending lengthwise in said cutting roller and with a lengthwise thin ridge projecting from said cutting roller between each pair of said spaced flutes, said cutting roller being positioned parallel to, and in contact with, the lower quadrant of said feed roller below said upper quadrant, and synchronous drive means to rotate said feed roller in one direction and to rotate said pocket-forming roller and said cutting roller in the opposite direction so that a sheet of said dough with said filler thereon and a second sheet of said dough supplied to the bite of said feed roller and said pocket-forming roller are first formed and cut into longitudinal strips of linked capsules containing said filler and then said strips are cut transversely in the bite of said feed roller and said cutting roller to yield said multiplicity of said dough capsules.

2. The apparatus of claim 1 wherein the thin ridges on the pocket-forming roller and/or the cutting roller are lengthwise corrugated.

3. The apparatus of claim 1 wherein a dimpling means is positioned to stretch the second sheet of dough inwardly in the cavities of the pocket-forming roller.

4. The apparatus of claim 1 wherein the pocket-forming roller and the cutting roller have a surface coating of polytetrafluoroethylene.

5. The apparatus of claim 1 wherein the synchronous drive means comprises a sprocket gear mounted on the axle of each of the feed roller, pocket-forming roller and cutting roller, and a link chain meshing with each said sprocket gear.

6. The apparatus of claim 1 wherein the cavities of the pocket-forming roller have open ends that are square, circular or oval.

7. The apparatus of claim 2 wherein the feed roller, the pocket-forming roller and the cutting roller are made of stainless steel, and said pocket-forming roller and said cutting roller have a surface coating of polytetrafluoroethylene.

8. The apparatus of claim 7 wherein a rotary disk with equi-spaced, radially extending fingers is positioned above the feed roller and adjacent the pocket-forming roller and is synchronously rotated with said pocket-forming roller so that said fingers move in and out of the cavities of said pocket-forming roller.

9. The apparatus of claim 8 wherein a flexible scraper blade is in contact over the length of the feed roller below the contact of the cutting roller with said feed roller.

* * * * *